United States Patent
Lin et al.

(10) Patent No.: US 10,514,515 B2
(45) Date of Patent: *Dec. 24, 2019

(54) TECHNIQUES FOR SHIELDING WITHIN AN OPTICAL TRANSCEIVER HOUSING TO MITIGATE ELECTROMAGNETIC INTERFERENCE BETWEEN OPTICAL SUBASSEMBLIES DISPOSED WITHIN THE SAME

(71) Applicant: Applied Optoelectronics, Inc., Sugar Land, TX (US)

(72) Inventors: Kai-Sheng Lin, Sugar Land, TX (US); Hsiu-Che Wang, Rosenberg, TX (US); Ziliang Cai, Richmond, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 390 days.

This patent is subject to a terminal disclaimer.

(21) Appl. No.: 15/475,073

(22) Filed: Mar. 30, 2017

(65) Prior Publication Data

US 2018/0284373 A1 Oct. 4, 2018

(51) Int. Cl.
*G02B 6/42* (2006.01)
*G02B 6/38* (2006.01)
*H01S 5/022* (2006.01)
*H04B 10/40* (2013.01)

(52) U.S. Cl.
CPC ......... *G02B 6/4277* (2013.01); *G02B 6/4246* (2013.01); *H04B 10/40* (2013.01); *G02B 6/4281* (2013.01)

(58) Field of Classification Search
CPC .... G02B 6/4277; G02B 6/4278; G02B 6/428; G02B 6/4281; G02B 6/4246; G02B 6/4249; G02B 6/4256; G02B 6/4215; G02B 6/4292; H04B 10/40
See application file for complete search history.

(56) References Cited

U.S. PATENT DOCUMENTS 7,130,194 B2 * 10/2006 Togami ............... G02B 6/4246 361/715
7,273,381 B2 * 9/2007 Ito ......................... H01R 12/58 439/79
7,425,098 B2 * 9/2008 Meadowcroft ...... G02B 6/4201 361/816

(Continued)

*Primary Examiner* — John R Lee
(74) *Attorney, Agent, or Firm* — Grossman Tucker Perreault & Pfleger, PLLC

(57) ABSTRACT

An optical transceiver module is disclosed having a housing that includes at least a first housing portion and a second housing portion, each of the first and second housing portions including a base portion having at least one sidewall extending therefrom that defines a compartment. The first housing portion is configured to couple to the second housing portion to form a cavity therebetween. A transmitter optical subassembly (TOSA) arrangement coupled to the base portion of the first housing portion and is electrically coupled to a first flexible printed circuit (FPC). A receiver optical subassembly (ROSA) arrangement is coupled to the base portion of the second housing portion and is electrically coupled to a second FPC. A first shield coupled to at least one of the first housing portion or the second housing portion to reduce electromagnetic interference between the TOSA arrangement and the ROSA arrangement.

20 Claims, 8 Drawing Sheets

(56) References Cited

U.S. PATENT DOCUMENTS

| | | | | |
|---|---|---|---|---|
| 7,798,820 B2* | 9/2010 | Hong | H05K 1/117 | 385/92 |
| 8,083,415 B2* | 12/2011 | Moore | G02B 6/4201 | 385/75 |
| 8,983,406 B2* | 3/2015 | Zhang | H03F 1/3205 | 330/307 |
| 10,230,470 B2* | 3/2019 | Lin | H04B 10/40 | |
| 10,247,892 B2* | 4/2019 | Lin | G02B 6/4256 | |
| 2002/0028048 A1* | 3/2002 | Dair | G02B 6/4214 | 385/92 |
| 2003/0118293 A1* | 6/2003 | Canace | G02B 6/4246 | 385/92 |
| 2003/0152339 A1* | 8/2003 | Dair | G02B 6/4246 | 385/92 |
| 2004/0069997 A1* | 4/2004 | Dair | G02B 6/4214 | 257/81 |
| 2004/0086240 A1* | 5/2004 | Togami | G02B 6/4246 | 385/92 |
| 2005/0117854 A1* | 6/2005 | Chiu | G02B 6/3825 | 385/92 |
| 2005/0152701 A1* | 7/2005 | Liu | G02B 6/4277 | 398/135 |
| 2009/0263140 A1* | 10/2009 | Kagaya | H05K 1/0224 | 398/139 |
| 2010/0008630 A1* | 1/2010 | Marrapode | G02B 6/3897 | 385/78 |
| 2011/0206328 A1* | 8/2011 | Wang | G02B 6/4246 | 385/94 |
| 2012/0269486 A1* | 10/2012 | Ishii | G02B 6/4246 | 385/92 |
| 2013/0022309 A1* | 1/2013 | Yu | G02B 6/4201 | 385/14 |
| 2013/0071072 A1* | 3/2013 | Xie | G02B 6/4277 | 385/92 |
| 2014/0112626 A1* | 4/2014 | Galloway | G02B 6/4279 | 385/88 |
| 2014/0286636 A1* | 9/2014 | Jiang | H04B 10/40 | 398/45 |
| 2015/0256261 A1* | 9/2015 | Ho | G02B 6/43 | 398/139 |
| 2015/0301293 A1* | 10/2015 | Seetharam | G02B 6/4277 | 385/60 |
| 2015/0372760 A1* | 12/2015 | Kagaya | G02B 6/4215 | 398/118 |
| 2016/0087676 A1* | 3/2016 | Tanaka | H04B 3/32 | 398/193 |
| 2016/0192545 A1* | 6/2016 | Mao | H05K 9/0058 | 398/136 |
| 2016/0238805 A1* | 8/2016 | McColloch | G02B 6/4268 | |
| 2016/0261348 A1* | 9/2016 | Murakami | H04B 10/548 | |
| 2017/0054507 A1* | 2/2017 | Elahmadi | H04L 7/0075 | |
| 2018/0052291 A1* | 2/2018 | Lin | G02B 6/4256 | |
| 2018/0284373 A1* | 10/2018 | Lin | G02B 6/4277 | |
| 2018/0287705 A1* | 10/2018 | Lin | H04B 10/40 | |
| 2019/0165926 A1* | 5/2019 | Stojanovic | H04L 7/0029 | |

* cited by examiner

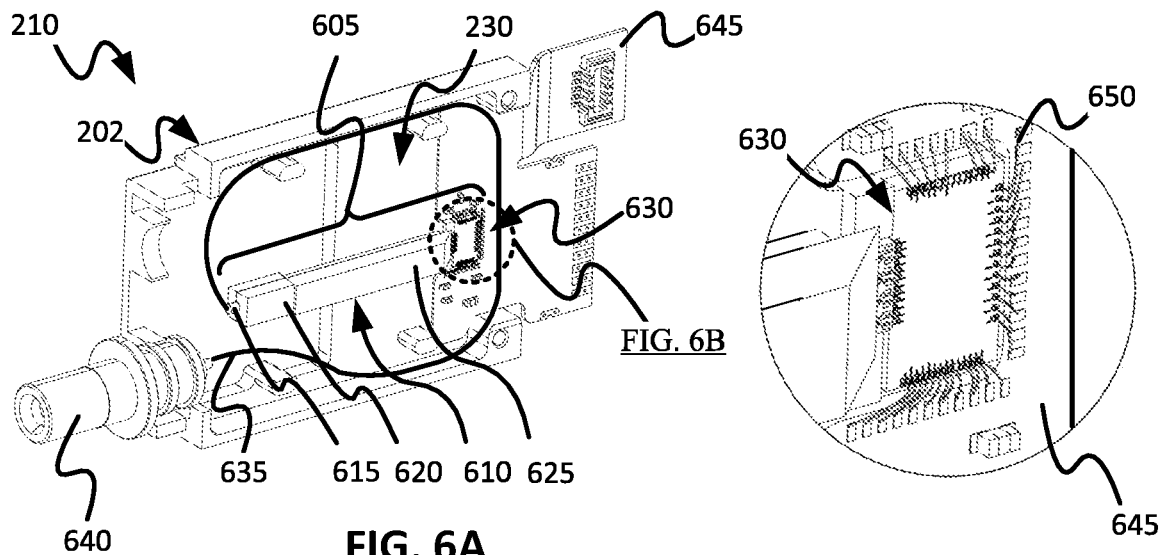
FIG. 6A
FIG. 6B
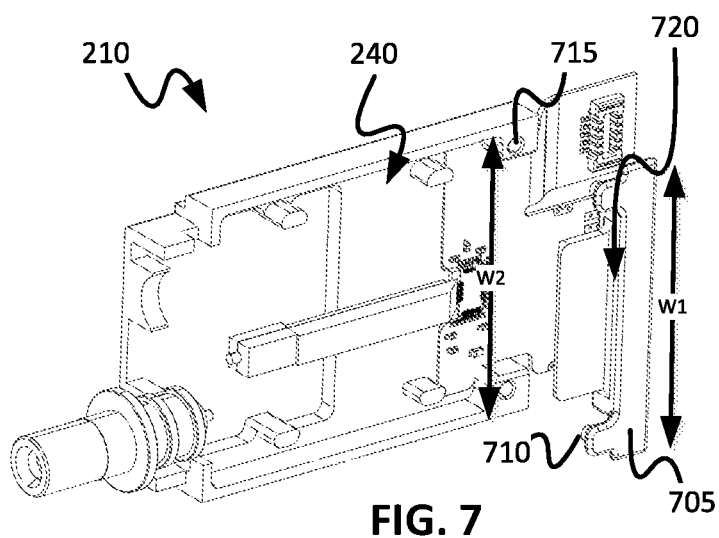
FIG. 7
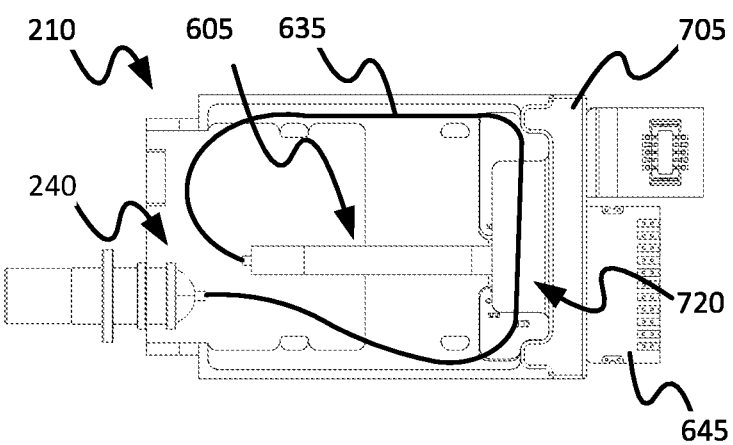
FIG. 8

TECHNIQUES FOR SHIELDING WITHIN AN OPTICAL TRANSCEIVER HOUSING TO MITIGATE ELECTROMAGNETIC INTERFERENCE BETWEEN OPTICAL SUBASSEMBLIES DISPOSED WITHIN THE SAME

TECHNICAL FIELD

The present disclosure relates generally to optical transceiver modules, and more particularly, to an optical transceiver module that includes shielding to reduce electromagnetic interference between a receiver optical subassembly (ROSA) and transmitter optical subassembly (TOSA) disposed within a housing of the optical transceiver module.

BACKGROUND

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges.

BRIEF DESCRIPTION OF THE DRAWINGS

These and other features and advantages will be better understood by reading the following detailed description, taken together with the drawings, wherein:

FIG. 6A is a perspective view of a ROSA portion of the optical transceiver module of FIGS. 2A and 2B having a ROSA arrangement consistent with embodiments of the present disclosure.

FIG. 6B is a detail view of part of the ROSA portion of the optical transceiver module of FIG. 6A, in accordance with an embodiment of the present disclosure.

FIG. 7 is a perspective view of the ROSA portion the optical transceiver module shown in FIG. 6 having a ROSA shield consistent with embodiments of the present disclosure.

FIG. 8 is a plan view of the ROSA portion of the optical transceiver module shown in FIG. 6 having an optical fiber consistent with embodiments of the present disclosure.

DETAILED DESCRIPTION

Figure 1:
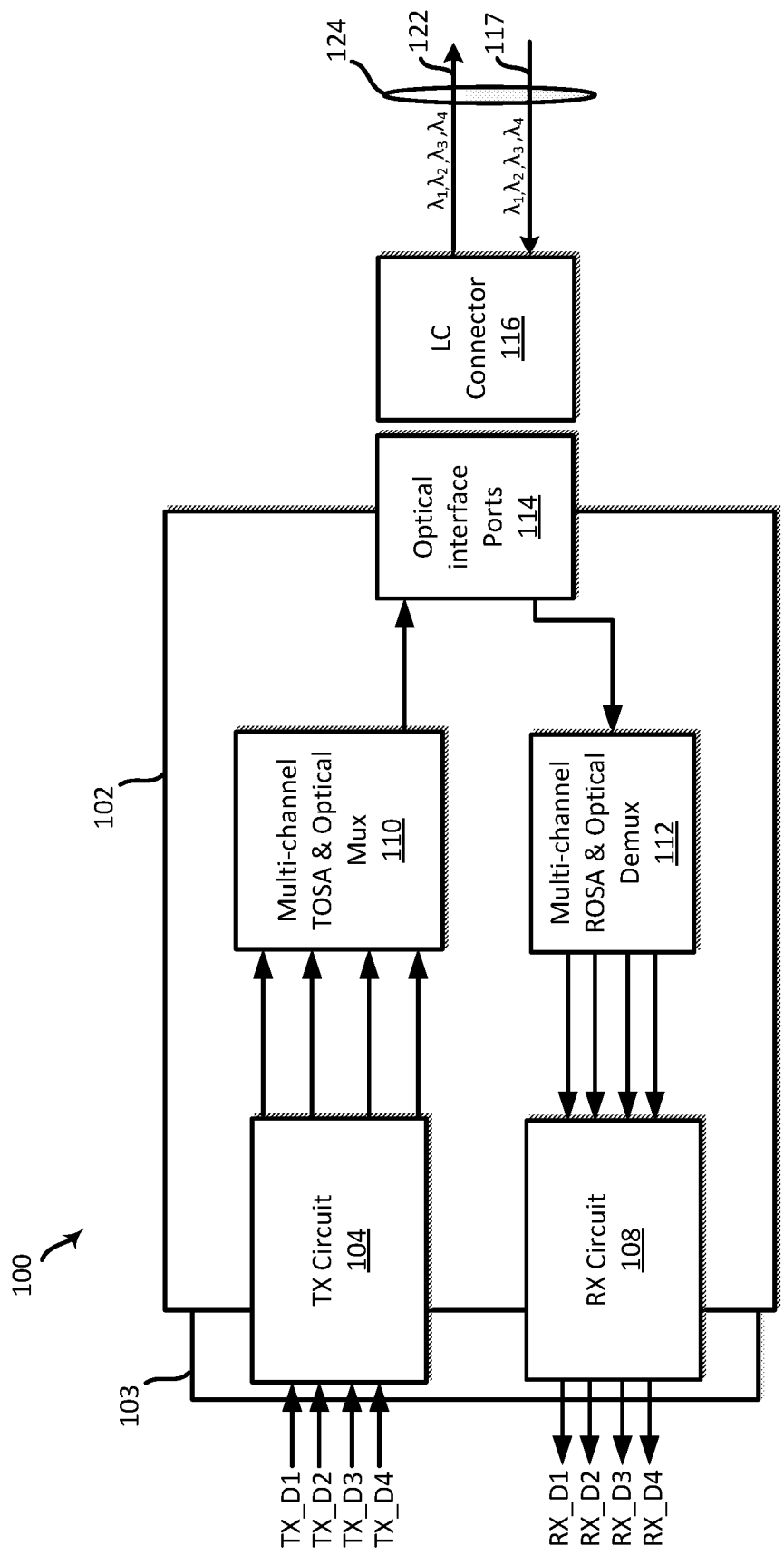
FIG. 1 schematically illustrates an embodiment of an optical transceiver including a multi-channel transmitter optical subassembly (TOSA) and multi-channel receiver optical subassembly (ROSA).

Optical transceiver modules often include transmitter optical subassemblies (TOSAs) and receiver optical subassemblies (ROSAs) within a housing or body. An optical transceiver module may operate as a stand-alone optical transceiver, or may be integrated into a secondary housing that comports with, for instance, a small form-factor (SFF) housing standard such as the one outlined within the "QSFP+ 28 Gb/s 4× Pluggable Transceiver Solution (QSFP28)" specification published on Jun. 29, 2015 by the SFF Committee. Such small form-factor housings introduce significant dimensional constraints that reduce the overall workspace within a transceiver housing, which places each of the components within an optical transceiver module in close proximity.

One technique to increase the workspace available within the transceiver housing is to use a bifurcated or multi-segment housing having at least two separate portions. In a general sense, each separate portion of the partitioned housing provides a dedicated workspace for coupling associated subassembly components. Once the TOSA and ROSA arrangements are sufficiently assembled within respective portions of the segmented housing, a technician may simply "flip" one portion of the partitioned housing over onto the other to couple the portions together and to collectively form an assembled optical transceiver module. Thus, the ROSA housing portion may be referred to as having a "flip over" configuration, whereby the ROSA arrangement faces the TOSA arrangement in an upside down manner when the respective housing portions are coupled together. Such a flip over configuration is discussed in further detail in co-pending U.S. application Ser. No. 15/242,017 entitled "An Optical Transceiver Module Having a Partitioned Housing," which is incorporated in its entirety herein by reference.

During the assembly of an optical transceiver module, one or more wire bonds may be formed to electrically couple one or more electrical components within the optical transceiver module together. Once formed, any physical contact with one or more of the wire bonds during subsequent assembly operations may result in damage to the wire bond and may necessitate a repair operation. For example, during assembly one or more optical fibers are routed within the optical transceiver module. During the routing process one or more optical fibers may contact and damage one or more wire bonds. Further, in a flip over configuration, when flipping the ROSA housing portion over the TOSA housing portion, a portion of an optical fiber within the ROSA housing portion may bend (or sag) such that a portion of the optical fiber descends into the TOSA housing portion, potentially contacting and damaging one or more wire bonds in the TOSA housing portion. After being assembled, movement of the optical transceiver module may result in the optical fibers moving such that the optical fibers contact and damage one or more of the wire bonds. Any subsequent repair operations may result in further damage to neighboring wire bonds and/or components, which may increase manufacturing costs and ultimately decrease yield.

During the operation of an optical transceiver module, the close proximity of the components within the optical transceiver module can result in the components electromagnetically interfering with each other. For example, high-speed integrated circuits (ICs) of a ROSA may cause electromagnetic interference (EMI) to impact performance of ICs within an adjacent TOSA, and vice-versa. The EMI (or radio frequency interference) may degrade the overall performance of the optical transceiver module. As the data transfer rate increases, the magnitude of the EMI increases. As such, the EMI may prevent a SFF compliant optical transceiver module from achieving a desired data transfer rate of, for example, 100 gigabits per second (Gb/s) or more.

Thus, in accordance with an embodiment, an optical transceiver module includes a housing having a TOSA and ROSA disposed in separate sections therein and at least one shielding member disposed between the TOSA and ROSA to minimize or otherwise reduce EMI therebetween. In an embodiment, the housing of the optical transceiver module includes at least a first housing portion and a second housing portion. The first housing portion includes a first base and at least one first sidewall extending from the base such that the first sidewall defines a first compartment. The second housing portion includes a second base and at least one second sidewall extending from the second base such that the second sidewall defines a second compartment. The first housing portion includes a first flexible printed circuit (FPC) electrically connected via a first set of wire bonds to a TOSA, and more particularly a high-speed IC of the same. The second housing portion includes a second FPC electrically connected via a second set of wire bonds to a ROSA, and more particularly a highs-speed IC of the same. A first shield is coupled to either the first housing portion and/or or the second housing portion such that at least one of the first or second set of wire bonds is at least partially covered by the shield. The first shield protects the first or second set of wire bonds from being damaged during assembly and/or reduces the effects of electromagnetic interference within the optical transceiver module.

Accordingly, the inclusion of at least a first shield may increase manufacturing efficiency by preventing one or more wire bonds from being inadvertently damaged during assembly. The inclusion of the shield may also result in an increase in the performance of the optical transceiver module by reducing the effects of the electromagnetic interference generated as a result of the operation of the TOSA and the ROSA.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

Now turning to FIG. 1, there is an optical transceiver 100 consistent with embodiments of the present disclosure. In more detail, the optical transceiver 100 transmits and receives four (4) channels using four different channel wavelengths ($\lambda_1$, $\lambda_2$, $\lambda_3$, $\lambda_4$) and may be capable of transmission rates of at least about 25 gigabits (Gbs) per channel or more. In one example, the channel wavelengths $\lambda_1$, $\lambda_2$, $\lambda_3$, $\lambda_4$ may be 1270 nm, 1290 nm, 1310 nm, and 1330 nm, respectively. The optical transceiver 100 may also be capable of both short transmission distances of tens of meters, for example, to distances of 2 kilometers or more. The optical transceiver 100 may be used, for example, in internet data center applications or fiber to the home (FTTH) applications. In an embodiment, the optical transceiver 100 implements a Quad Small Form-Factor Pluggable (QSFP) transceiver. For example, the optical transceiver 100 may be implemented within a QSFP transceiver that comports with the QSFP28 specification as discussed above. The aspects and embodiments disclosed herein may be used within other transceiver types and is not necessarily limited to QSFP or QFSP+ transceivers. The optical transceiver 100 may be configured for dense wavelength division multiplexing (DWDM) or course wavelength division multiplexing (CWDM), depending on a desired configuration. Although aspects and scenarios disclosed herein discuss a four (4) channel configuration, other channel configurations, e.g., 2, 4, 16, 32, and so on, are within the scope of this disclosure.

As shown, the optical transceiver 100 includes a transceiver housing 102 that may include a multi-channel TOSA arrangement 110 for transmitting optical signals on different channel wavelengths, and a multi-channel ROSA 112 for receiving optical signals on different channel wavelengths within a single transceiver housing, as will be discussed further herein. A transmit connecting circuit 104 and a receive connecting circuit 108 provide electrical connections to the multi-channel TOSA arrangement 110 and the multi-channel ROSA arrangement 112, respectively, within the transceiver housing 102. The transmit connecting circuit 104 and the receive connecting circuit 108 may communicate with external systems via data bus 103. In some cases, data bus 103 is a 38-pin connector that comports with physical connector QSFP standards and data communication protocols.

In any event, the transmit connecting circuit 104 electrically couples to the electronic components in the multi-channel TOSA arrangement 110, e.g., laser assemblies, and the receive connecting circuit 108 electrically couples to the electronic components in the multi-channel ROSA 112, e.g., an arrayed waveguide grating (AWG), detectors, amplification circuitry and so on. The transmit connecting circuit 104 and the receive connecting circuit 108 include at least conductive paths to provide electrical connections, and may also include additional circuitry. The multi-channel TOSA arrangement 110 transmits and multiplexes multiple different channel wavelengths, and is coupled to an optical interface port 114. The optical interface port 114 may include an LC connector port, although other connector types are also within the scope of this disclosure.

In cases where the optical interface port 114 comprises a duplex, or bi-directional, LC receptacle, the LC connector receptacle provides optical connections to the multi-channel TOSA arrangement 110, and provides optical connections to the multi-channel ROSA 112. The LC connector receptacle may be configured to receive and be coupled to a mating LC connector 116 such that transmit optical fiber 122 of the external fibers 124 optically couples to the multi-channel arrangement TOSA 110, and the receive optical fiber 117 of the external fibers 124 optically couples to the multi-channel ROSA 112.

The multi-channel TOSA arrangement 110 can include multiple laser packages and optics for producing associated channel wavelengths, and can couple the same into the transmit optical fiber 122. In particular, the lasers in the multi-channel TOSA arrangement 110 can convert electrical data signals (TX_D1 to TX_D4) received via the transmit connecting circuit 104 into modulated optical signals transmitted over transmit optical fiber 122. The lasers may include, for example, distributed feedback (DFB) lasers with diffraction gratings. In other cases, the lasers may comprise electro-absorption modulated laser (EML) laser diode packages. The multi-channel TOSA arrangement 110 may also include monitor photodiodes for monitoring the light emitted by the lasers. The multi-channel TOSA arrangement 110 may further include one or more temperature control devices, such as a resistive heater and/or a thermoelectric cooler (TEC), for controlling a temperature of the lasers, for example, to control or stabilize the laser wavelengths.

The multi-channel ROSA 112 can include demultiplexing optics such as an AWG device and a plurality of detectors such as photodiode packages configured to receive de-multiplexed channel wavelengths. The ROSA 112 can use the detectors and associated circuitry (e.g., a TIA) to detect, amplify, and convert de-multiplexed channel wavelengths and can provide the same as electrical data signals, e.g., RX_D1 to RX_D4.

Figure 2A:
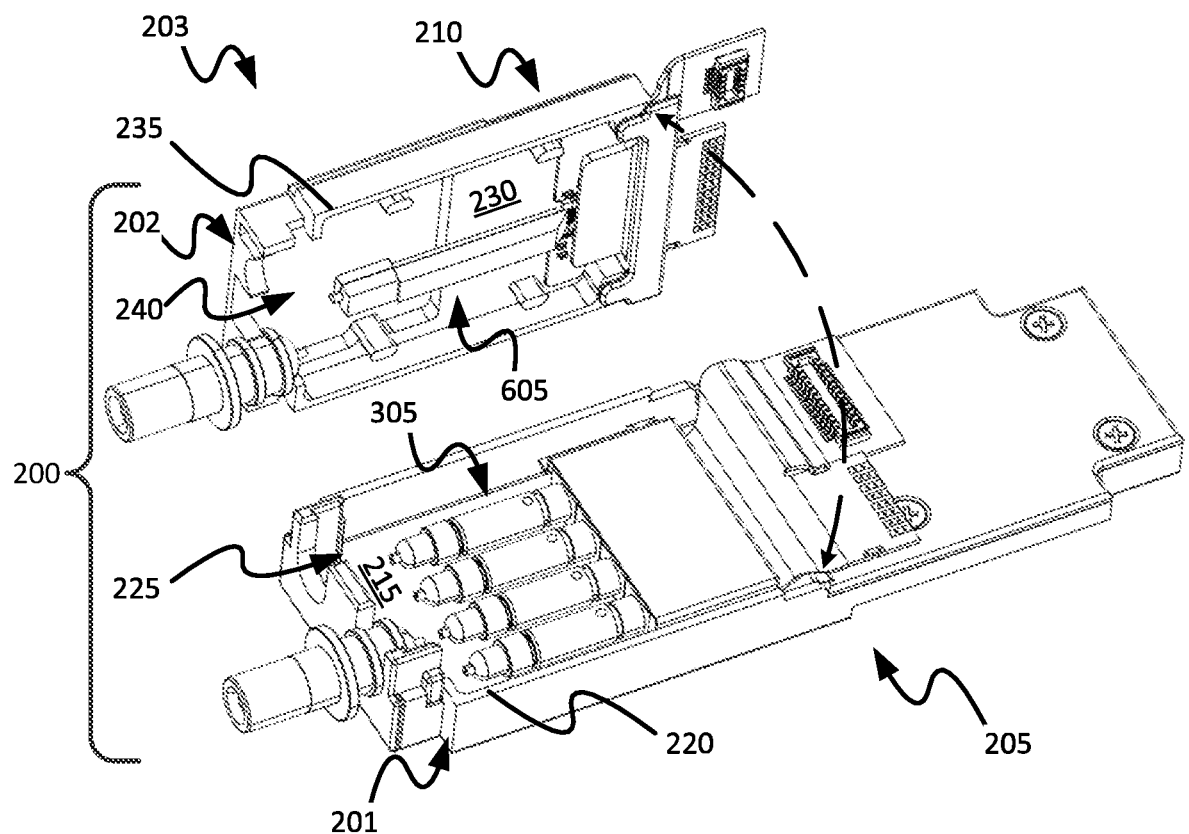
FIG. 2A is an exploded view of an optical transceiver module consistent with embodiments of the present disclosure.

FIG. 2A shows an optical transceiver module 203 that may be used with the optical transceiver 100 of FIG. 1. The optical transceiver 203 may include a first portion 205, which may also be referred to as a TOSA portion 205, and a second portion 210, which may also be referred to as a ROSA portion 210. The first and second portions 205, 210 may collectively provide a partitioned housing 200. The first and second portions 205, 210 may couple together using, for example, at least one of adhesives (e.g., such as an epoxy), mechanical couplings (such as a friction fit, snap fit, or screw), and/or other suitable forms of coupling.

The TOSA portion 205 includes a base 201 which provides a TOSA mounting surface 215 configured to be coupled at least to a TOSA arrangement 305. A TOSA portion sidewall 220 extends from the TOSA mounting surface 215 such that an inner surface of the TOSA portion sidewall 220 defines a TOSA compartment 225. The TOSA arrangement 305 may include laser packages and multiplexing optics to produce a signal having multiple channel wavelengths, as discussed in further detail below. Note while the present disclosure shows cuboid-shaped laser packages, this disclosure is not limited in this regard and other laser package types are within the scope of this disclosure.

When the TOSA arrangement 305 is coupled to the TOSA mounting surface 215, the TOSA arrangement 305 is disposed within the TOSA compartment 225. The ROSA portion 210 includes a base 202 that provides ROSA mounting surface 230 configured to be coupled at least to a ROSA arrangement 605. A ROSA portion sidewall 235 extends from the ROSA mounting surface 230 such that an inner surface of the ROSA portion sidewall 235 defines a ROSA compartment 240. The ROSA arrangement 605 may include, for example, a de-multiplexing device such an arrayed waveguide grating (AWG) and associated circuitry such as a transimpedance amplifier (TIA), which is more clearly shown in FIG. 6B. However, this disclosure is not limited in this regard and other types of optical demultiplexing devices may be utilized.

Figure 2B:
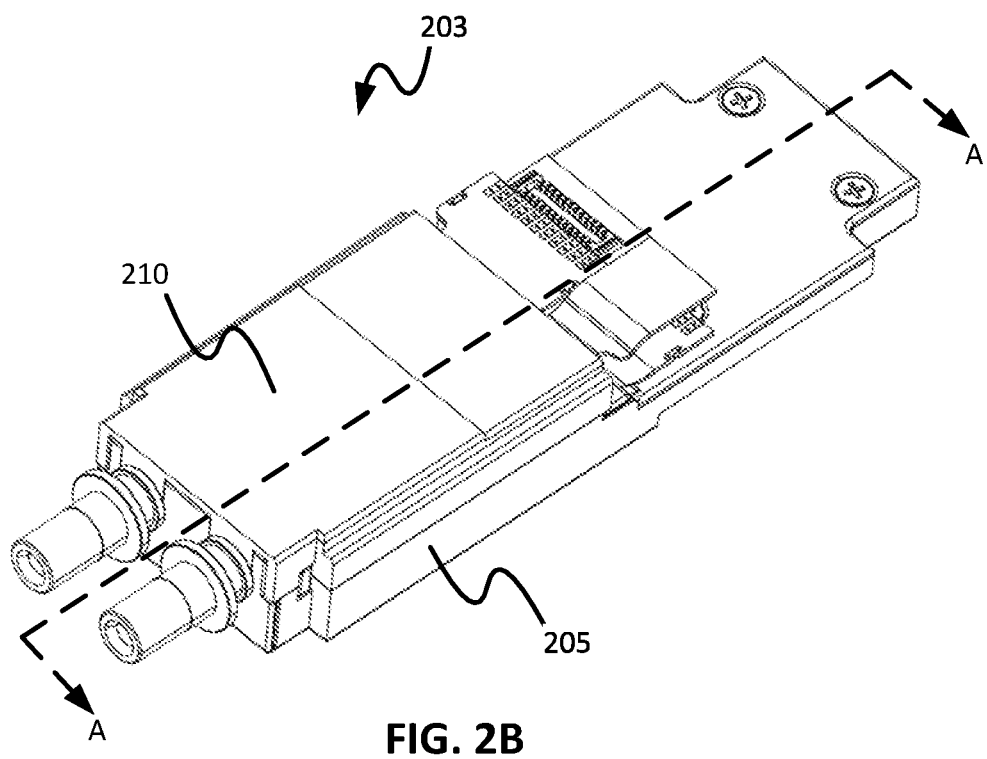
FIG. 2B is a perspective view of the optical transceiver module of FIG. 2A consistent with embodiments of the present disclosure.

When the ROSA arrangement 605 is coupled to the ROSA mounting surface 230, the ROSA arrangement 605 is disposed within the ROSA compartment 240. As shown in FIG. 2B, when the optical transceiver module 203 is assembled the ROSA portion 210 may be generally described as being "flipped" over the TOSA portion 205 such that the ROSA portion 210 is opposite the TOSA portion 205. Once assembled, the TOSA compartment 225 and the ROSA compartment 240 may collectively define a cavity, wherein the TOSA is opposite the ROSA within the cavity, for example, in an opposing fashion.

Figure 3A:
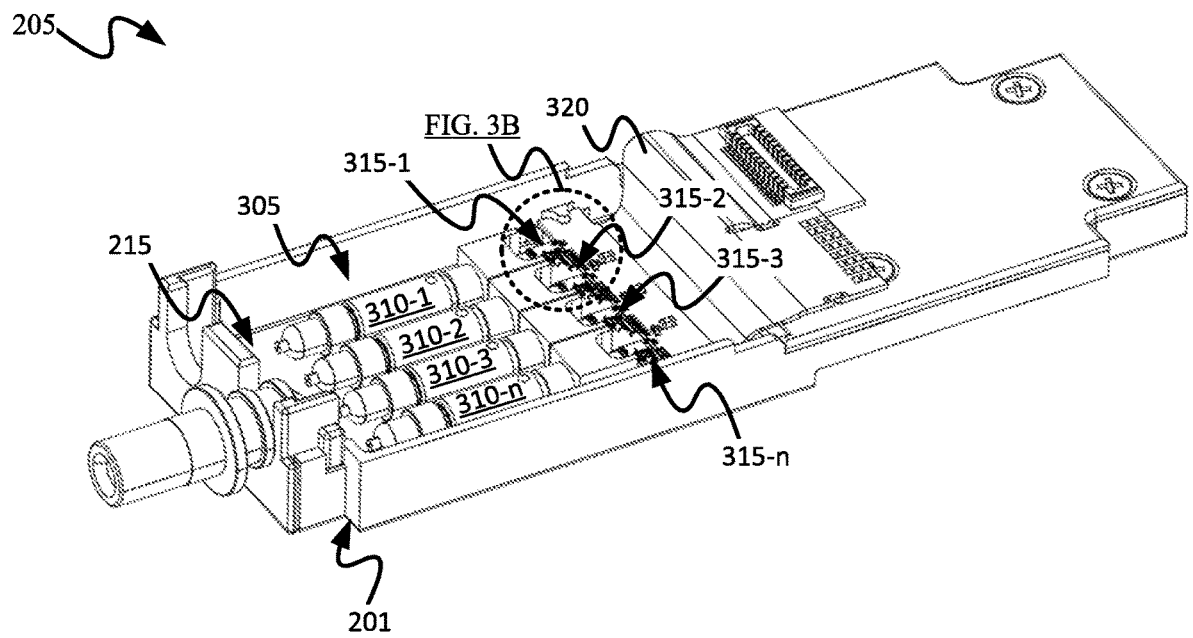
FIG. 3A is a perspective view of a TOSA portion of the optical transceiver module of FIGS. 2A and 2B having a TOSA arrangement consistent with embodiments of the present disclosure.

As shown in FIG. 3A, and with continued reference to the preceding figures, the TOSA portion 205 includes the TOSA arrangement 305 coupled to the TOSA mounting surface 215. The TOSA arrangement 305 includes one or more laser packages 310-1 to 310-$n$ electrically coupled to a respective driving circuit 315-1 to 315-$n$, with driving circuits 315-1 to 315-$n$ including a laser diode driver (LDD), for example. Each of the respective driving circuits 315-1 to 315-$n$ is electrically coupled to a transmit flexible printed circuit (FPC) 320 via, for example, wire bonding. The transmit FPC 320 receives one or more electrical signals to be used to generate a corresponding optical signal using the one or more laser packages 310-1 to 310-$n$.

Figure 3B:
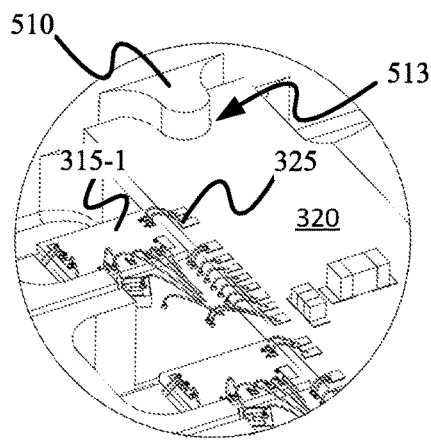
FIG. 3B is a detail view of part of the TOSA portion of the optical transceiver module of FIG. 3A, in accordance with an embodiment of the present disclosure.

As shown in FIG. 3B, and with continued reference to the preceding figures, the TOSA arrangement 305 is electrically coupled to the transmit FPC 320 through a respective one or more driving circuits 315-1 to 315-$n$ using a first set of wire bonds 325. As signals are transmitted from the transmit FPC 320 to the TOSA arrangement 305 an electromagnetic field may be generated. The intensity of the generated electromagnetic field may be a function of the data transfer rate. For example, as the data transfer rate increases, the intensity of the generated electromagnetic field increases. Therefore, at high data transfer rates (e.g., in excess of 100 gigabits per second or more) the generated electromagnetic field may interfere with the performance of neighboring components such as the ROSA arrangement 605 (FIG. 2A).

Figure 4:
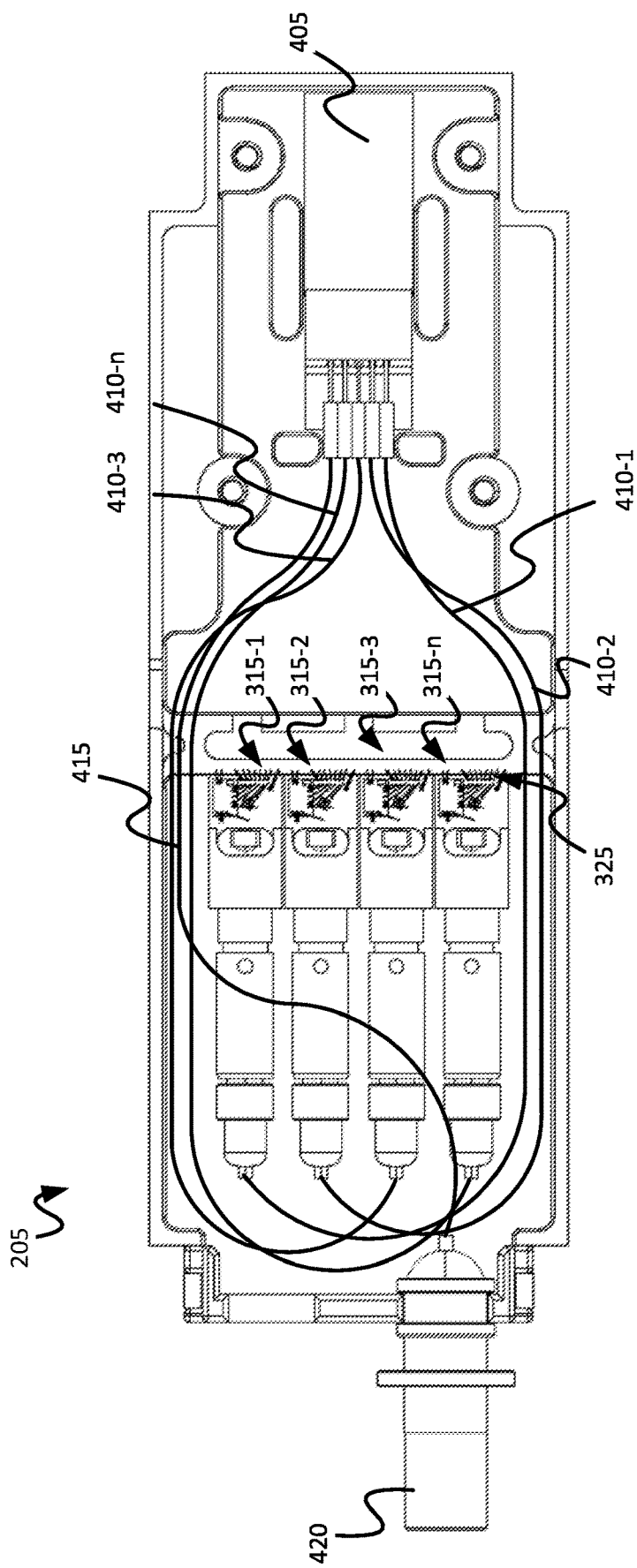
FIG. 4 is a plan view of the TOSA portion of the optical transceiver module shown in FIG. 3 having a plurality of optical fibers, in accordance with an embodiment of the present disclosure.

As shown in FIG. 4, and with continued reference to the preceding figures, the generated optical signal is transmitted to an arrayed waveguide grating (AWG) 405 via a corresponding optical fiber 410-1 to 410-$n$. The AWG 405 optically multiplexes each optical signal into a single transmit signal. The transmit signal is transmitted over a transmit optical fiber 415. The transmit optical fiber 415 optically couples the AWG 405 to a TOSA optical interface port 420.

As shown, the optical fibers 410-1 to 410-$n$ and the transmit optical fiber 415 are routed around the driving circuits 315-1 to 315-$n$ and the first set of wire bonds 325. During the routing process one or more of the optical fibers 410-1 to 410-$n$ and/or the transmit optical fiber 415 may contact driving circuits 315-1 to 315-$n$ or one or more of the wire bonds included in the first set the wire bonds 325. Such contact during the routing process may result in one or more of the driving circuits 315-1 to 315-$n$ and/or one or more of the wire bonds included in the first set wire bonds 325 becoming damaged. Further, after the optical fibers 410-1 to 410-$n$ and the transmit optical fiber 415 have been routed within the TOSA portion 205, any movement of the TOSA portion 205 may cause at least one of the optical fibers 410-1 to 410-$n$ or the transmit optical fiber 415 to move within the TOSA portion and potentially damage at least one of the wire bonds included in the first set wire bonds 325 or driving circuits 315-1 to 315-*n*.

Figure 5:
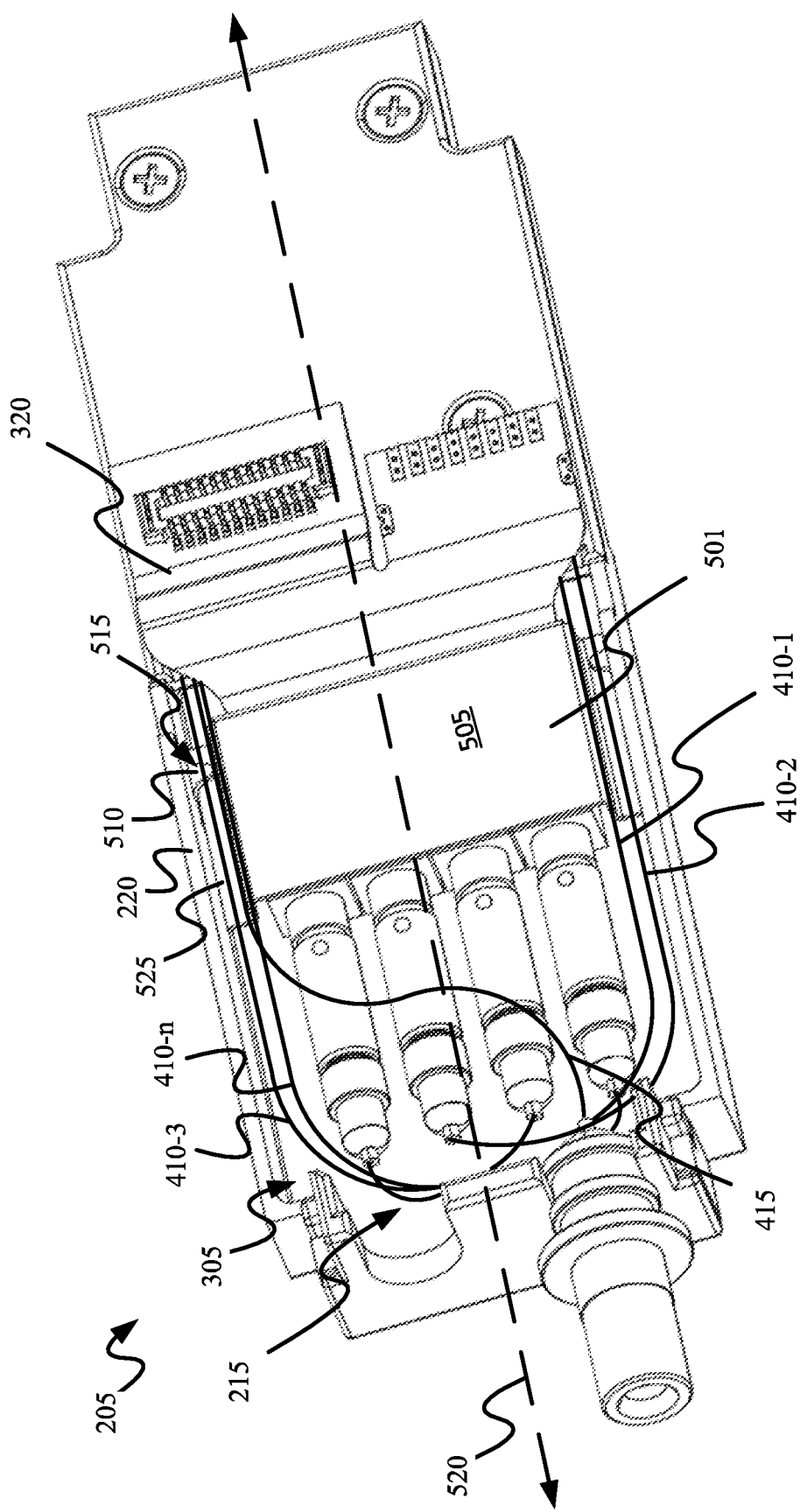
FIG. 5 is a perspective view of the TOSA portion of the optical transceiver module shown in FIG. 3 including a TOSA shield consistent with embodiments of the present disclosure.

As shown in FIG. 5, and with continued reference to the preceding figures, the TOSA portion 205 may include a TOSA shield 505 or shield member 505. The TOSA shield 505 may be coupled to the TOSA mounting surface 215, the TOSA arrangement 305, and/or the transmit FPC 320 using any combination of adhesives (such as a silver epoxy), mechanical couplings (such as a friction fit, snap fit, or screw), and/or other suitable forms of coupling. For example, the TOSA shield 505 may be coupled to the TOSA arrangement 305 using a silver epoxy. In this embodiment, the TOSA portion 205 may comprise a same or different material from that of the TOSA shield 505.

As shown, the TOSA shield 505 at least partially covers the section of the TOSA portion 205 that includes the driving circuits 315-1 to 315-*n* (FIG. 3A) and/or the first set of wire bonds 325 (FIG. 3B). In some instances, the TOSA shield 505 may substantially enclose each of the driving circuits 315-1 to 315-*n*. For example, the TOSA shield 505 may include a plurality of walls that extend substantially perpendicular from a base portion 501 to couple to the mounting surface 215.

In some embodiments, each of the optical fibers 410-1 to 410-*n* and the transmit optical fiber 415 are routed around and/or over the TOSA shield 505 to avoid damaging one or more of the driving circuits 315-1 to 315-*n* and/or one or more of the wire bonds included in the first set of wire bonds 325. The TOSA shield 505 may be coupled to the TOSA portion 205 before the routing of the optical fibers 410-1 to 410-*n* and/or the transmit optical fibers 415. Further, when the routing process is complete, the TOSA shield 505 may also prevent damage to one or more of the driving circuits 315-1 to 315-*n* and/or one or more of the wire bonds included in the first set of wire bonds 325 due to any movement of the optical fibers 410-1 to 410-*n* and the transmit optical fiber 415 within the TOSA portion 205.

In some embodiments, the TOSA shield 505 may also provide electromagnetic shielding. The electromagnetic shielding may reduce the effects of the electromagnetic field generated when electric data signals are transmitted from the transmit FPC 320 to the TOSA arrangement 305 (e.g., block at least 10% of total electromagnetic emissions). The electromagnetic shielding may also at least partially shield the TOSA arrangement 305 from electromagnetic fields, e.g., by blocking at least 10% of electromagnetic energy, generated by other components within the transceiver module 203, such as the ROSA 605 (FIG. 2A). As discussed herein, as the data transfer rate is increased, the intensity of the generated electromagnetic field increases. Therefore, the inclusion of the TOSA shield 505 may allow the TOSA arrangement 305 to transmit data at higher rates (e.g., greater than 100 gigabits per second).

Various materials may be used to form the TOSA shield 505. For example, the material may be selected based upon the electrical conductivity of the material and/or the magnetic permeability of the material. For example, the TOSA shield 505 may be a plate or a mesh sheet made of silver, copper, gold, aluminum, brass, bronze, tin, lead, nickel, stainless steel, and other like metals or alloys. When the TOSA shield 505 includes a mesh, the effectiveness of the shielding may be influenced by the mesh size (e.g., the spacing between individual openings in the mesh).

As is also shown in FIG. 5, the TOSA portion 205 may also include one or more retaining elements (or tongues) 510 to align and/or retain the TOSA shield 505. The one or more retaining elements 510 may be defined by an inner surface of the TOSA portion sidewall 220. The TOSA shield 505 may include one or more recesses (or grooves) 515 for receiving the retaining elements 510 (collectively forming, for example, a tongue and groove). The TOSA shield 505 may also include one or more platforms 525 (or feet 525) that extend from a sidewall of the TOSA shield 505 in the direction of the TOSA portion sidewall 220. In some embodiments, a press fit and/or snap fit may be formed between the one or more feet 525 and the TOSA portion sidewall 220.

When the transmit FPC 320 is coupled to the TOSA portion 205, the transmit FPC 320 may also engage the one or more retaining elements 510 using, for example, a corresponding one or more recesses 513 (see, e.g., FIG. 3B). When engaging the one or more retaining elements 510, the TOSA shield 505 and/or the transmit FPC 320 may resist movement along a longitudinal axis 520. By reducing or preventing the movement of the TOSA shield 505 along the longitudinal axis 520, the TOSA shield 505 may remain positioned substantially over each of the driving circuits 315-1 to 315-*n* and the first set of wire bonds 325 once coupled to the TOSA portion 205. Further, by reducing or preventing the movement of the transmit FPC 320 along the longitudinal axis 520 the tensile strain experienced by the first set wire bonds 325 may be reduced.

As shown in FIG. 6A, and with continued reference to the preceding figures, the ROSA portion 210 includes the ROSA arrangement 605 coupled to the ROSA mounting surface 230. The ROSA arrangement 605 includes an arrayed waveguide grating (AWG) device 610 and an array of photodiodes and associated transimpedance amplifiers (TIAs) 630. The AWG device 610 includes an optical coupling port 615, an input coupling region 620, and an AWG chip region 625. A receive optical fiber 635 optically couples the input coupling region 620 to a ROSA interface port 640. An optical signal is received at the ROSA interface port 640, is transmitted through the receive optical fiber 635, and is received by the ROSA arrangement 605 at the input coupling region 620. The array of photodiodes and associated TIAs 630 convert the received optical signal into an electrical signal. The electrical signal is then transmitted to a receive FPC 645.

As shown in FIG. 6B, and with continued reference to the preceding figures, the array of photodiodes and associated TIAs 630 are electrically coupled to the receive FPC 645 using a second set of wire bonds 650. As electrical signals are transmitted from the ROSA arrangement 605 to the receive FPC 645 an electromagnetic field may be generated. The intensity of the generated electromagnetic field may be a function of the data transfer rate. For example, as the rate of data transfer increases, the intensity of the electromagnetic field increases.

Returning to FIG. 6A, as shown, the receive optical fiber 635 is routed around the array of photodiodes and associated TIAs 630. During the routing process the receive optical fiber 635 may contact the array of photodiodes and associated TIAs 630 and/or one or more of the wire bonds included in the second set wire bonds 650. Contact during the routing process may result in the array of photodiodes and associated TIAs 630 and/or one or more of the wire bonds included in the second set wire bonds 650 becoming damaged. Further, after the receive optical fiber 635 is routed, movement of the ROSA portion 210 may cause the receive optical fiber 635 to also move within the ROSA portion and damage the array of photodiodes and associated TIAs 630 and/or one or more wire bonds included in the second set wire bonds 650.

As shown in FIG. 7, and with continued reference to the preceding figures, a ROSA shield 705 may be coupled to the ROSA portion 210. The ROSA shield 705 may include one or more protrusions 710 that correspond to one or more openings 715 extending at least partially through the ROSA portion 210. The protrusion 710 and corresponding the opening 715 may be sized such that when the protrusion 710 is received within the opening 715 a press fit is formed. Additionally, or alternatively, the ROSA shield 705 may be coupled to the ROSA portion 210 using at least one of adhesives (such as a silver epoxy), mechanical couplings (such as a snap fit or screw), and/or other suitable forms of coupling. As shown, the ROSA shield 705 may include a stepped region 720. The stepped region 720 extends into the ROSA compartment 240 when the ROSA 705 is coupled to the ROSA portion 210. The width W1 of the ROSA shield 705 may be substantially equal to the width W2, e.g., within 10% or less.

As shown in FIG. 8, and with continued reference to the preceding figures, when the ROSA shield 705 is coupled to the ROSA portion 210, the stepped region 720 of the ROSA shield 705 extends into the ROSA compartment 240 such that the stepped region 720 at least partially covers a portion of the ROSA section, with the ROSA section including the array of photodiodes and associated TIAs 630 (FIG. 6A) and/or one or more of the wire bonds included in the second set wire bonds 650 (FIG. 6B). In some instances, the ROSA shield 705 may substantially enclose the array of photodiodes and associated TIAs 630. The receive optical fiber 635 can then be routed over the ROSA shield 705. As such, the process of routing the receive optical fiber 635 will not substantially interfere with the array of photodiodes and associated TIAs 630 and/or one or more of the wire bonds included in the second set wire bonds 650. In other words, the receive optical fiber 635 is coupled to the ROSA portion 210 after the ROSA shield 705 is coupled to the ROSA portion 210. Further, when the routing process is complete, the ROSA shield 705 may also prevent damage to the array of photodiodes and associated TIAs 630 and/or one or more of wire bonds included in the second set wire bonds 650 when the receive optical fiber 635 moves within the ROSA portion 210.

Additionally, or alternatively, in some embodiments, the ROSA shield 705 provides electromagnetic shielding. The electromagnetic shielding may reduce the effects of the electromagnetic field generated when optical signals are converted to electrical signals and transmitted to the receive FPC 645 (e.g., block at least 10% of emitted electromagnetic energy). As discussed herein, as the data transfer rate increases, the intensity of the generated electromagnetic field increases. Therefore, the inclusion of the ROSA shield 705 may allow for the ROSA arrangement 605 to receive data at higher rates (e.g., greater than 100 gigabits per second) without causing unacceptable electromagnetic interference with neighboring components. Further the ROSA shield 705 may shield the ROSA arrangement 605 from electromagnetic fields generated by, for example, the TOSA arrangement 305 (FIG. 2A).

Various materials may be used to form the ROSA shield 705. For example, the material may be selected based upon the electrical conductivity of the material and/or the magnetic permeability of the material. For example, the ROSA shield 705 may be a plate or a mesh sheet made of silver, copper, gold, aluminum, brass, bronze, tin, lead, nickel, stainless steel, and other like metals or alloys. When the ROSA shield 705 includes a mesh, the effectiveness of the shielding may be influenced by the mesh size (e.g., the spacing between individual openings in the mesh).

Figure 9:
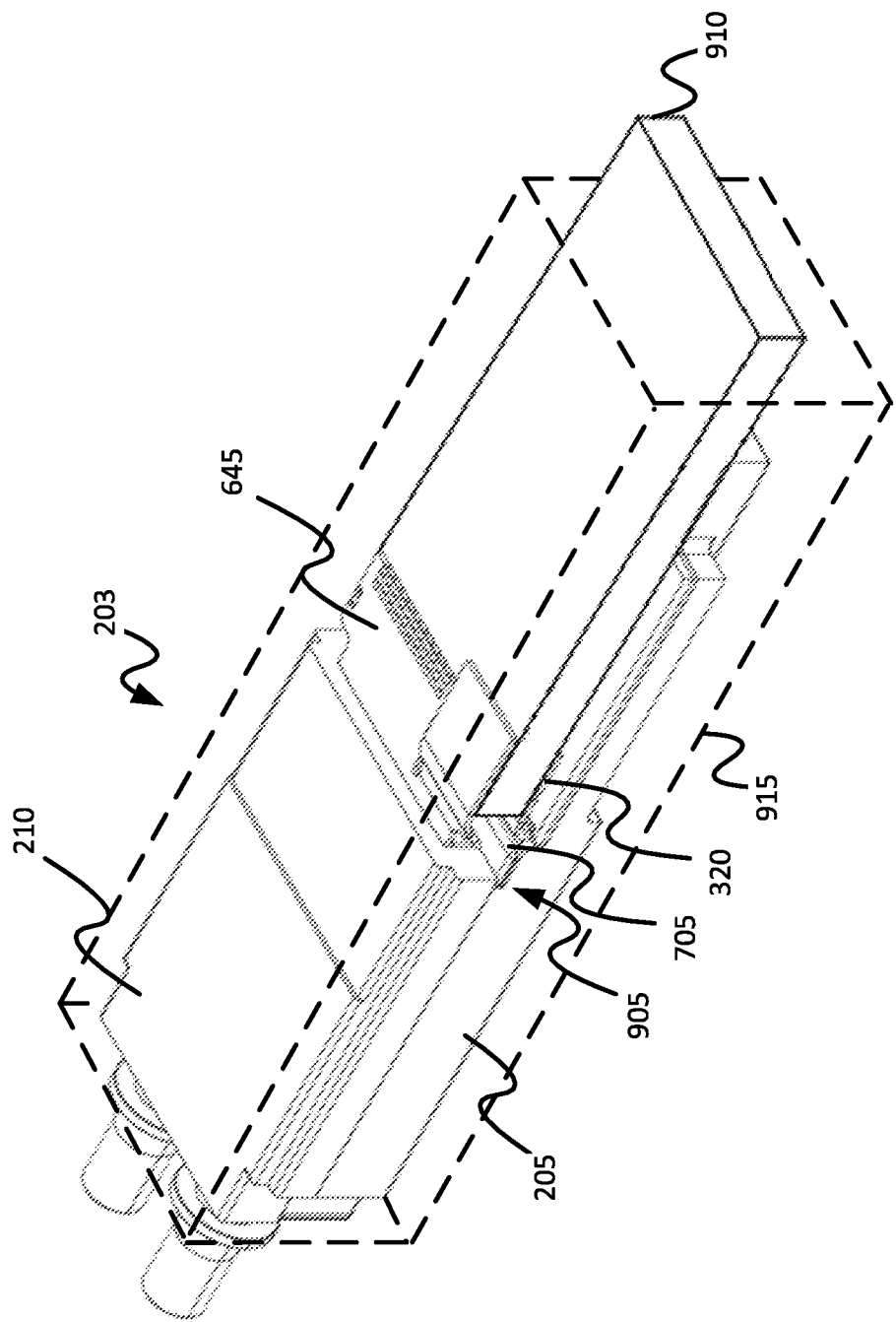
FIG. 9 is a perspective view of the transceiver module of FIGS. 2A and 2B disposed within a pluggable transceiver housing consistent with embodiments of the present disclosure.

FIG. 9 shows an assembled transceiver module 203. The transceiver module 203 includes the TOSA portion 205 having the TOSA arrangement 305 (FIG. 2A) coupled thereto and a ROSA portion 210 having the ROSA arrangement 605 (FIG. 2A) coupled thereto. When assembled, the electromagnetic field generated by the TOSA arrangement 305 may interfere with the performance of the ROSA arrangement 605 and the electromagnetic field generated the ROSA arrangement 605 may interfere with the performance of the TOSA arrangement 305. The resulting interference may prevent the transceiver module 203 from operating at desired data transfer rates (e.g., data transfer rates in excess of 100 gigabits per second). However, as discussed herein the inclusion of one or more of the TOSA shield 505 and/or the ROSA shield 705 may reduce the effects of the electromagnetic fields generated by the operation of the TOSA arrangement 305 and/or the ROSA arrangement 605.

As shown in FIG. 9, the TOSA portion 205 may include a recess (or groove) 905 for receiving the ROSA shield 705. The inclusion of the recess 905 may reduce the number of gaps at the interface between the TOSA portion 205 and the ROSA portion 210. To further reduce the presence of gaps a sealant or interstitial filler may be applied at the interface between the TOSA portion 205 and the ROSA portion 210. For example, an adhesive, such as an epoxy, may be applied at the interface to fill one or more gaps present at the interface and to couple to the TOSA portion 205 to the ROSA portion 210. However, when a sealant or interstitial filler is used, the sealant or interstitial filler does not need to have adhesive properties.

As is also shown in FIG. 9, the transceiver module 203 may include a printed circuit board assembly (PCBA) 910 coupled to the transmit FPC 320 and the receive FPC 645. The transceiver module 203 and the PCBA 910 may be at least partially enclosed within a pluggable transceiver housing 915 such that at least a portion of the PCBA 910 and/or the transceiver module 203 extends from the pluggable transceiver housing 915.

Figure 10:
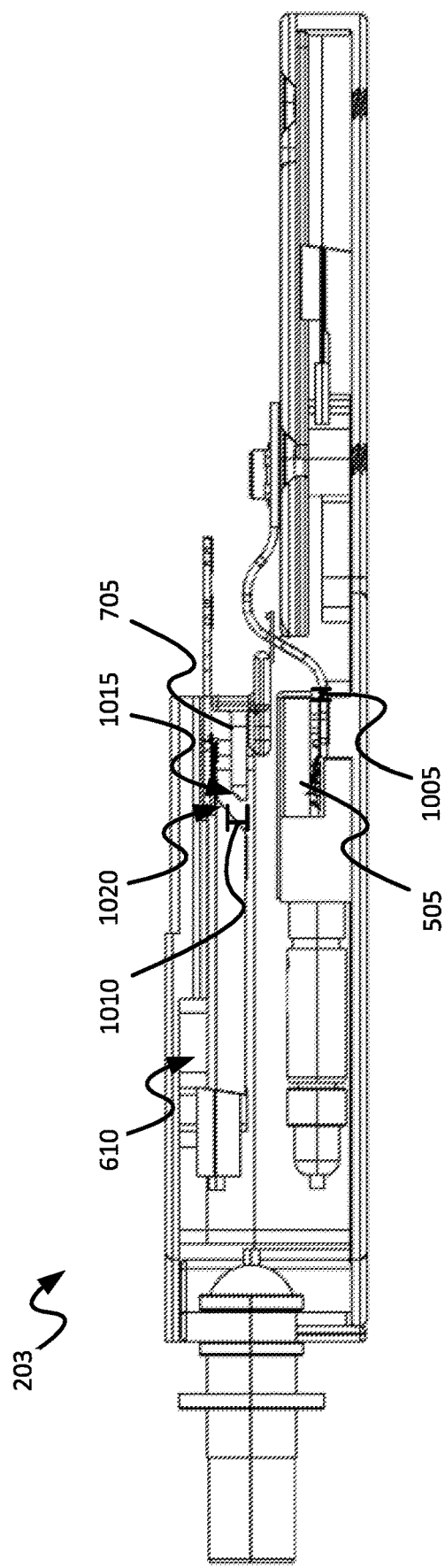
FIG. 10 is a cross-sectional view taken along the line A-A of the optical transceiver module of FIG. 2B, in accordance with an embodiment of the present disclosure.

FIG. 10 shows a cross section of the transceiver module 203 taken along the line A-A of FIG. 2. In an embodiment, the ROSA shield 705 extends within the transceiver module 203 substantially in parallel with TOSA shield 505. As further shown in FIG. 10, the TOSA shield 505 has a first thickness 1005 and the ROSA shield 705 has second thickness 1010. As shown, the second thickness 1010 measures greater than the first thickness 1005. For example, the second thickness 1010 may measure between two and ten times greater than the first thickness 1005. By way of further example, the second thickness 1010 may measure four times greater than the first thickness 1005. In some embodiments, the TOSA shield 505 and/or the ROSA shield 705 may have a non-uniform thickness.

As is also shown, the ROSA shield 705 may include a tapered region 1015. In some embodiments, the tapered region 1015 may be substantially parallel to a tapered surface 1020 of the AWG device 610. The tapered region 1015 may reduce the risk of the ROSA shield 705 impacting the AWG device 610 during installation.

Additional Example Aspects

Consistent with an aspect of the present disclosure an optical transceiver module is disclosed. The optical transceiver module comprising a housing including at least a first housing portion and a second housing portion, each of the first and second housing portions including a base portion having at least one sidewall extending therefrom that defines a compartment, wherein the first housing portion is configured to couple to the second housing portion to form a cavity therebetween, a transmitter optical subassembly (TOSA) arrangement coupled to the base portion of the first housing portion and electrically coupled to a first flexible printed circuit (FPC), a receiver optical subassembly (ROSA) arrangement coupled to the base portion of the second housing portion and electrically coupled to a second FPC, and a first shield coupled to at least one of the first housing portion or the second housing portion to reduce electromagnetic interference between the TOSA arrangement and the ROSA arrangement.

In accordance with another aspect an optical transceiver module is disclosed. The optical transceiver module comprising a housing including at least a first housing portion and a second housing portion, each of the first and second housing portions including a base portion having at least one sidewall extending therefrom that defines a compartment, wherein the first housing portion is configured to couple to the second housing portion to form a cavity therebetween, a transmitter optical subassembly (TOSA) arrangement coupled to the base portion of the first housing portion, the TOSA arrangement including at least one driving circuit, a receiver optical subassembly (ROSA) arrangement coupled to the base portion of the second housing portion, the ROSA arrangement including an array of photodiodes and associated transimpedance amplifier (TIA), and a first shield coupled to the first housing portion and at least partially surrounding the at least one driving circuit of the TOSA to reduce electromagnetic interference between the TOSA arrangement and the ROSA arrangement.

In accordance with another aspect of the present disclosure an optical transceiver is disclosed. The optical transceiver comprising a pluggable housing, an optical transceiver module housing at least partially disposed within the pluggable housing, the optical transceiver module housing comprising, a first housing portion defined by a first base and at least one first sidewall extending therefrom, wherein the first base and an inner surface of the first sidewall define a first compartment, and a second housing portion defined by a second base and at least one second sidewall extending therefrom, wherein the second base and an inner surface of the second sidewall define a second compartment, a transmitter optical subassembly (TOSA) arrangement disposed within the first compartment, a receiver optical subassembly (ROSA) disposed within the second compartment, wherein the TOSA arrangement and ROSA arrangement are disposed in an opposing fashion, a first flexible printed circuit (FPC) electrically coupled to the TOSA arrangement using at least a first set of wire bonds and a second FPC electrically coupled to the ROSA arrangement using at least a second set of wire bonds, a first shield coupled to the first housing portion and at least partially covering the first set of wire bonds, a second shield coupled to the second housing portion and at least partially covering the second set of wire bonds, and a printed circuit board assembly (PCBA) electrically coupled to the first FPC and to the second FPC.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical transceiver module comprising:
    a housing including at least a first housing portion and a second housing portion, each of the first and second housing portions including a base portion having at least one sidewall extending therefrom that defines a compartment, wherein the first housing portion is configured to couple to the second housing portion to form a cavity therebetween;
    a transmitter optical subassembly (TOSA) arrangement coupled to the base portion of the first housing portion and electrically coupled to a first flexible printed circuit (FPC);
    a receiver optical subassembly (ROSA) arrangement coupled to the base portion of the second housing portion and electrically coupled to a second FPC; and
    a first shield coupled to at least one of the first housing portion or the second housing portion to reduce electromagnetic interference between the TOSA arrangement and the ROSA arrangement.

2. The optical transceiver module of claim 1, wherein the TOSA arrangement and the ROSA arrangement are disposed opposite each other within the cavity when the first housing portion is coupled to the second housing portion.

3. The optical transceiver module of claim 1, wherein the TOSA arrangement includes at least one laser diode driver (LDD), and wherein the first shield coupled to the first housing portion covers at least a portion of the at least one LDD.

4. The optical transceiver module of claim 1, wherein the TOSA arrangement is electrically coupled to the first FPC via wire bonding, and wherein the first shield covers at least a portion of the wire bonding.

5. The optical transceiver module of claim 4, wherein the first shield comprises a metal or a metal alloy.

6. The optical transceiver module of claim 1, further comprising a second shield coupled to the second housing portion.

7. The optical transceiver module of claim 6, wherein the ROSA arrangement is electrically coupled to the second FPC via wire bonding, and wherein the second shield covers at least a portion of the wire bonding.

8. The optical transceiver module of claim 6, wherein the ROSA includes a transimpedance amplifier (TIA), and wherein the second shield covers at least a portion of the TIA.

9. The optical transceiver module of claim 6, wherein the first shield has a first thickness and the second shield has a second thickness, the second thickness being greater than the first thickness.

10. An optical transceiver module comprising:
    a housing including at least a first housing portion and a second housing portion, each of the first and second housing portions including a base portion having at least one sidewall extending therefrom that defines a compartment, wherein the first housing portion is configured to couple to the second housing portion to form a cavity therebetween;
    a transmitter optical subassembly (TOSA) arrangement coupled to the base portion of the first housing portion, the TOSA arrangement including at least one driving circuit;
    a receiver optical subassembly (ROSA) arrangement coupled to the base portion of the second housing portion, the ROSA arrangement including an array of photodiodes and associated transimpedance amplifier (TIA); and a first shield coupled to the first housing portion and at least partially surrounding the at least one driving circuit of the TOSA to reduce electromagnetic interference between the TOSA arrangement and the ROSA arrangement.

11. The optical transceiver module of claim 10, wherein the TOSA arrangement and the ROSA arrangement are disposed opposite each other within the cavity when the first housing portion is coupled to the second housing portion.

12. The optical transceiver module of claim 11, further comprising:

a first flexible printed circuit (FPC) electrically coupled to the at least one driving circuit using at least a first set of wire bonds; and a second FPC electrically coupled to the array of photodiodes and associated TIAs using at least a second set of wire bonds.

13. The optical transceiver module of claim 12, wherein the first shield at least partially covers the first set of wire bonds.

14. The optical transceiver module of claim 10, wherein the first shield includes a width which is substantially equal to that of a width of the first housing portion.

15. The optical transceiver module of claim 10, wherein the first shield is coupled to the first housing portion using a silver epoxy.

16. The optical transceiver module of claim 10, further comprising a second shield coupled to the second housing portion.

17. The optical transceiver module of claim 16, wherein the second shield covers at least a portion of the TIA of the ROSA arrangement.

18. The optical transceiver module of claim 16, wherein the first shield has a first thickness and the second shield has a second thickness, the second thickness being greater than the first thickness.

19. An optical transceiver comprising:

a pluggable housing;

an optical transceiver module housing at least partially disposed within the pluggable housing, the optical transceiver module housing comprising:

a first housing portion defined by a first base and at least one first sidewall extending therefrom, wherein the first base and an inner surface of the first sidewall define a first compartment; and a second housing portion defined by a second base and at least one second sidewall extending therefrom, wherein the second base and an inner surface of the second sidewall define a second compartment;

a transmitter optical subassembly (TOSA) arrangement disposed within the first compartment;

a receiver optical subassembly (ROSA) disposed within the second compartment, wherein the TOSA arrangement and ROSA arrangement are disposed in an opposing fashion;

a first flexible printed circuit (FPC) electrically coupled to the TOSA arrangement using at least a first set of wire bonds and a second FPC electrically coupled to the ROSA arrangement using at least a second set of wire bonds;

a first shield coupled to the first housing portion and at least partially covering the first set of wire bonds;

a second shield coupled to the second housing portion and at least partially covering the second set of wire bonds; and a printed circuit board assembly (PCBA) electrically coupled to the first FPC and to the second FPC.

20. The optical transceiver of claim 19, wherein the optical transceiver module is configured to send and receive channel wavelengths at a rate of at least 100 gigabits per second.

* * * * *